United States Patent [19] [11] 4,035,474
Kunkel et al. [45] July 12, 1977

[54] CBA FOR CLAUS TAIL GAS CLEANUP

[75] Inventors: Lorenz V. Kunkel, Naperville, Ill.; John W. Palm, Tulsa, Okla.; Luther E. Petty, Darien, Ill.; Howard Grekel, Houston, Tex.

[73] Assignee: Standard Oil Company (Indiana), Chicago, Ill.

[21] Appl. No.: 662,402

[22] Filed: Mar. 1, 1976

[51] Int. Cl.² ........................................ C01B 17/04
[52] U.S. Cl. ............................ 423/574 R; 423/576
[58] Field of Search .................... 423/573, 574, 576

[56] References Cited

U.S. PATENT DOCUMENTS 3,702,884  11/1972  Hunt et al. .................... 423/574 G
3,749,762   7/1973  Montgomery ................. 423/574 G
3,758,676   9/1973  Goddin et al. ................. 423/574 G

FOREIGN PATENT DOCUMENTS 722,038  1/1955  United Kingdom .............. 423/574

*Primary Examiner*—G. O. Peters
*Attorney, Agent, or Firm*—Robert B. Stevenson; Arthur McIlroy

[57] ABSTRACT

An improved method for further removal of sulfur from the tail gas of a conventional Claus plant by the use of a Cold Bed Adsorption process involving the specific improvement of maintaining at all times the lead Claus reactor of a series of such reactors at sufficiently high temperatures to promote hydrolysis of COS and $CS_2$ and then utilizing part or all of the hot effluent gases of this lead reactor to regenerate the sulfur-fouled Cold Bed Adsorption catalyst by passing the hot stream through the fouled reactor, removing the deposited sulfur and then returning the stream to the Claus plant at a point essentially immediately downstream from where it was originally withdrawn. Such a method is useful in maintaining ultra-high sulfur conversion levels on a commercial scale.

17 Claims, 5 Drawing Figures

CBA FOR CLAUS TAIL GAS CLEANUP

BACKGROUND OF THE INVENTION

1. Field of the Invention

The present invention relates to an improved process for catalytic conversion of the $H_2S$ and $SO_2$ present in a gaseous stream to elemental sulfur and the subsequent removal of the sulfur. More specifically, it is concerned with the removal of sulfur from the tail gas of a conventional Claus plant by the use of a Cold Bed Adsorption process. This improved process is particularly useful for design of new plants to obtain higher conversion to elemental sulfur than was formerly required. It can also be used to bring an already existing Claus plant involving a series of Claus reactors into compliance with the contemporary restrictive $SO_2$ emission standards.

2. Description of the Prior Art

In the so-called Cold Bed Adsorption (CBA) process, typically as described in U.S. Pat. Nos. 3,702,844, 3,758,676, and 3,749,762, the hydrogen sulfide and sulfur dioxide content of Claus plant gas streams is decreased by conversion to elemental sulfur in the presence of a Claus-type catalyst at a temperature between about 270° and 300° F. Since the Claus reaction is a reversible exothermic reaction and since the chemical process that occurs in the reactor can be viewed as an approach to chemical equilibrium, the lower temperatures associated with the CBA reactor have in principle two advantages over the higher temperature Claus reactor, each of which contributes to lower reactant concentrations and more efficient removal of sulfur. Namely, the temperature dependence of the thermodynamic equilibrium constant of an exothermic reaction favors lower reactant concentrations as the temperature decreases. And, the particular temperature range of the CBA reactor is below the dew point of sulfur, thus physical deposition of the reaction product (sulfur) as an adsorbed phase occurs. This deposition reduces the concentration of the sulfur in the gaseous reaction mixture and thus further reduces the equilibrium concentrations of the reactants ($H_2S$ and $SO_2$). However, this is not an advantage in that the sulfur deposited on the catalyst bed will ultimately prevent the catalytic reaction from occurring. Thus, the CBA reactor, unlike the high-temperature Claus reactor, must periodically be regenerated by vaporizing the deposited sulfur with a hot stripping gas followed by a cooling back to the desired operating temperature.

Various methods of accomplishing the overall CBA process, including the required regeneration and cooling of the catalyst bed, have been proposed. For example, in U.S. Pat. No. 3,702,884, a pair of CBA units is used as an addition to a Claus plant wherein one of the reactors is operated in the cleanup mode, while the other is being regenerated and cooled off-stream in a recycle mode. Usually, the off-stream regeneration involves a condenser, blower, and heater to recycle the gas already present in the CBA unit with makeup gas being added only to compensate for volume changes associated with the cooling of the gas. A large amount of fuel gas is consumed in the heater to heat the recycle gas to the relatively high temperature required for regeneration. In U.S. Pat. Nos. 3,758,676 and 3,749,762, more complicated processes involving at least three catalytic reactors are disclosed wherein the high temperature level of the stripping gas, which is required for regeneration, is achieved by Claus reaction in the regeneration reactor, and all reactors are continuously on-stream acting in either a Claus clean up, CBA clean up, or CBA regeneration and cooling mode. In both of these processes the regeneration and cooling steps are accomplished by altering the relative positions of the reactors in the overall flow as well as controlling the temperature, but all reactors stay on-stream. There is no recycle off-stream as was the case in U.S. Pat. No. 3,702,884. All three processes, when properly designed and engineered, can achieve as high as 99 percent removal of sulfur. However, by attempting to maintain these high conversion levels, the sulfur losses due to COS, $CS_2$ and elemental sulfur play a more significant role. In particular, the hydrolysis of the COS and $CS_2$ becomes a critical consideration and a primary objective. For a more detailed discussion of their role, see a paper presented at the Gas Processors Association 53rd Annual Convention, Mar. 25 through 27, 1974, Denver, Colo., authored by C. S. Goddin, E. B. Hunt, and J. W. Palm, and entitled "Amoco CBA Process for Improving Claus Plant Recovery," herein incorporated by reference.

When attempting to achieve and maintain high conversion levels from an existing Claus plant by the addition of a CBA reactor downstream, various pragmatic considerations complicate the situation. For example, if the presently existing Claus plant is already being operated at maximum capacity, it may be necessary to maintain the space velocities and gross capacity of the Claus portion at its previous level at all times to satisfy the needs of the particular plant. Yet simultaneously, the concept of utilizing an indigenous stream of this Claus plant as a source stream to regenerate the CBA reactors may be economically mandatory but inconsistent with maintaining gross capacity. In view of these problems, we have discovered a particular method of implementing a CBA process downstream from an existing Claus plant which essentially preserves the capacity of the Claus plant, allows for optimization of the hydrolysis of the COS and $CS_2$, thus maintaining high conversion levels and still has the economic benefits of using an indigenous stream to accomplish the regeneration of the sulfur-fouled CBA reactors. Such a method can also be used advantageously in designing new plants, including situations where conventional Claus reactors are installed initially with the CBA reactors being added later when needed.

SUMMARY OF THE INVENTION

We have discovered in a process for catalytic conversion of a gaseous stream containing hydrogen sulfide wherein said stream is subjected to an oxidation step to produce a reaction mixture in which hydrogen sulfide and sulfur dioxide are present in a molar ratio of about 2:1 and wherein the sulfur content of said reaction mixture is substantially reduced by first passing said mixture through a series of at least two Claus reactors with associated liquid sulfur condensers and then passing the resulting Claus effluent through a CBA cleanup step involving at least two interchangeable CBA reactors wherein said Claus effluent at all times passes through at least one of said CBA reactors, having been previously regenerated to further convert and condense the sulfur for a time sufficient to allow said other interchangeable CBA reactor to be regenerated by thermal removal of deposited sulfur followed by cooling of the sulfur-denuded CBA reactor, the improvement comprising (a) maintaining the reaction conditions of a lead Claus reactor such that the effluent temperature of said reactor is from about 600° to 800° F, thus promoting hydrolysis of COS and $CS_2$; (b) diverting, periodically, a stream containing from about 5 to 100 percent of said effluent of said lead Claus reactor to the CBA reactor, having deposited sulfur on the catalyst bed of said CBA reactor, thereby vaporizing and removing said deposited sulfur and regenerating said CBA catalyst bed; (c) returning the effluent of said CBA reactor being regenerated during said period of regeneration to a point downstream from said lead Claus reactor and downstream from where said stream is diverted but upstream to the subsequent Claus reactors; and (d) cooling the sulfur-denuded CBA reactor before returning it to the cleanup mode for further removal of sulfur from the effluent of said Claus reactors.

The primary objective of this invention is to provide an improved method of combining a conventional Claus plant with a CBA plant in such a manner that the overall sulfur removal can be maintained at contemporary ultra-high conversion levels. An associated object is to have this method sufficiently flexible such that the CBA reactors can be added to a preexisting Claus plant containing a series of reactors without significantly altering the maximum capacity of the Claus plant, yet still be able to utilize indigenous streams for regeneration of sulfur-fouled CBA reactors. Implicit in both of these objectives are provisions for reducing the significances of sulfur losses due to incomplete hydrolysis of COS and $CS_2$.

In all embodiments of this invention, a stream of hot effluent from one of the lead Claus converters of a series of Claus reactors is utilized as the indigenous regeneration gas for removing sulfur deposited on the CBA reactors. In one embodiment, the sulfur-rich effluent of the CBA reactor during this regeneration step is returned to the inlet side of the sulfur condenser downstream from the lead Claus converter and upstream from the next Claus converter. In another embodiment, this return gas from regeneration is routed to the inlet of a heat exchanger immediately upstream of the sulfur condenser previously referenced. In another embodiment, the sulfur-rich effluent of the CBA reactor during this regeneration step goes to a condenser for removal of sulfur and then is reheated to the proper temperature before being returned to the inlet of the second Claus converter. In still other embodiments, the hot regeneration gas and/or the cooling gas is directed through the CBA reactor during regeneration and/or cooling in a direction opposite to that employed while the CBA reactor is cleaning up the tail gas of the Claus plant. And in another embodiment, three CBA reactors are employed such that two of the three are always operating in parallel to clean up the tail gas while the third is being regenerated and then cooled. Other objects and embodiments will be apparent to one skilled in the art upon complete reading of the specification and claims.

DESCRIPTION OF THE PREFERRED EMBODIMENTS

The improved method for maintaining ultra-high conversion levels of sulfur using a CBA process to clean up the tail gas of a Claus plant according to the present invention can best be explained and understood by reference to the accompanying drawing.

Figure 1:
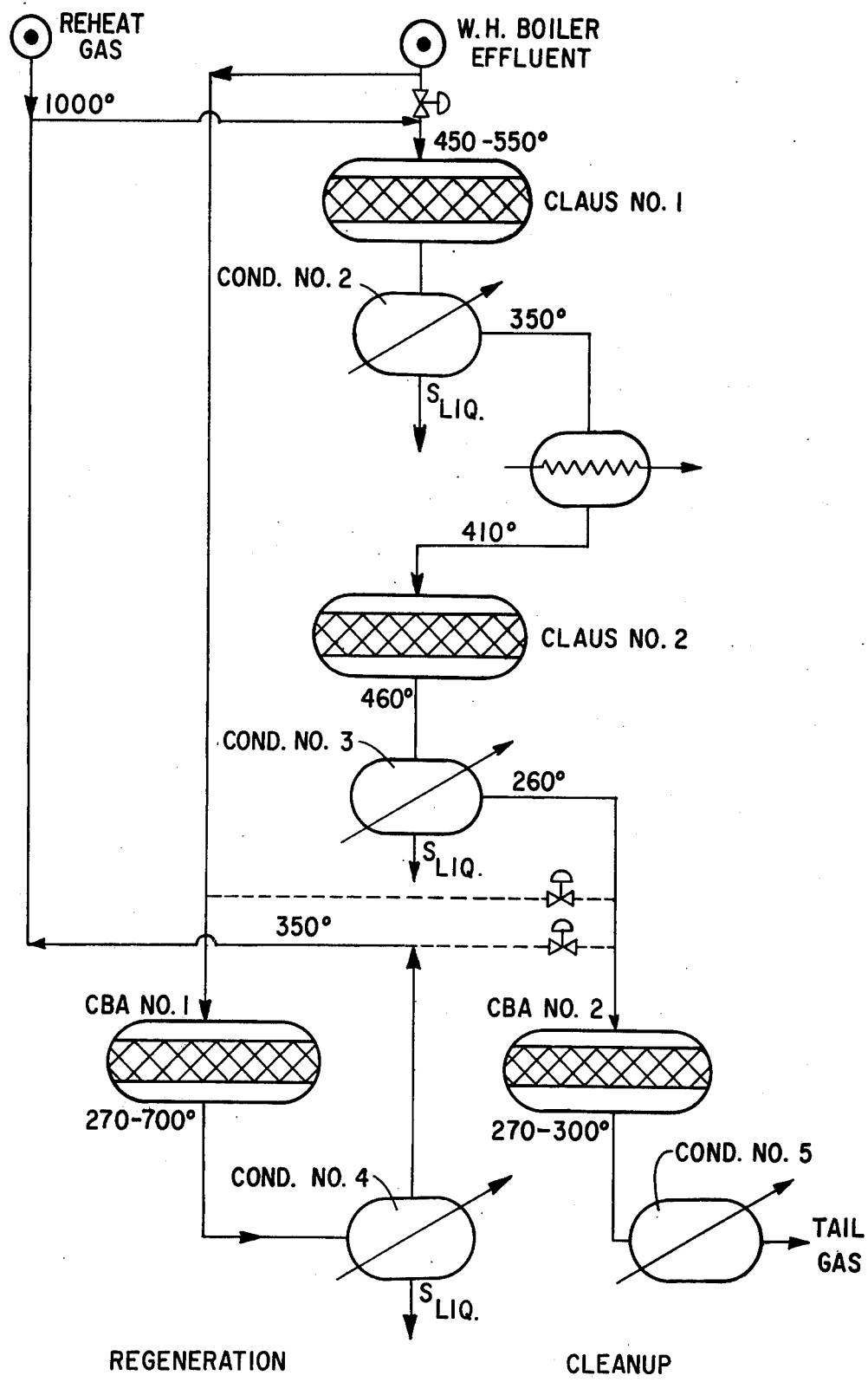
FIG. 1 and FIG. 2 of the drawing are flow diagrams illustrating the basic CBA process for improved Claus plant recovery, as presented in the previous paper incorporated by reference. As such, they represent a process known in the prior art.
Figure 2:
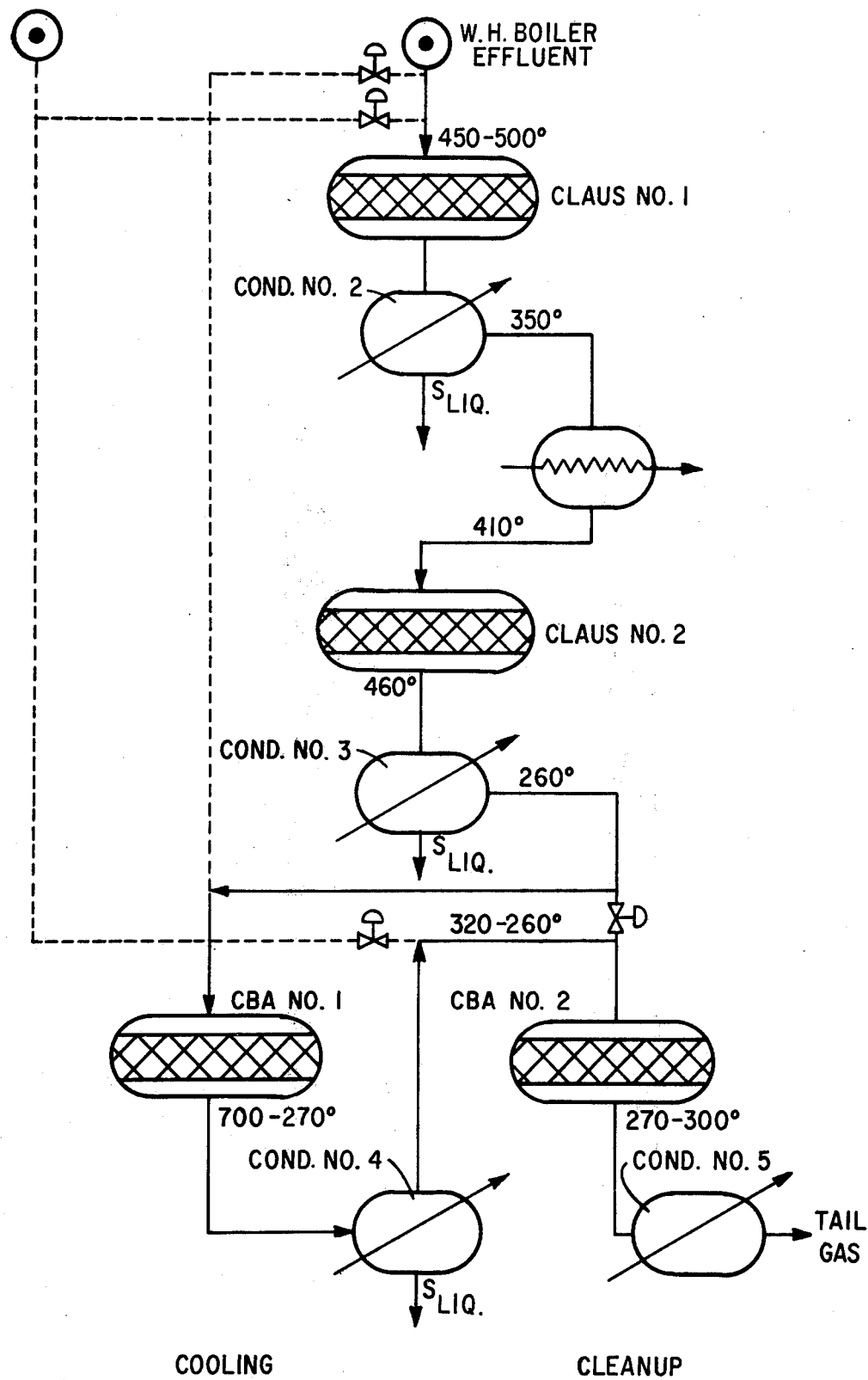

FIG. 1 and FIG. 2 of the drawing are simplified flow diagrams which illustrate conditions during regeneration and cooling periods of the CBA cycle. These figures are taken directly out of published literature and, as such, represent that which is known in the art. They are simplified in that not all valves and piping for cyclic operation are shown. However, they are illustrative of the state of the art, particularly in that they describe how the CBA process is adapted for cleanup of the tail gas from a two-reactor conventional Claus plant.

FIG. 1 shows conditions when CBA reactor number 1 is on regeneration and number 2 on cleanup. Tail gas from Claus reactor number 2 is cooled to 260° F in condenser number 3 and sent to CBA reactor number 2 for cleanup. During cleanup, essentially all of the sulfur produced is adsorbed on the catalyst. Our tests have shown that a surprisingly high sulfur loading can be tolerated without significant decline in catalyst activity, permitting cleanup periods of 8 hours or more. The effluent gas from the cleanup step is low in elemental sulfur content and can be sent directly to the incinerator. While CBA reactor number 2 is on cleanup, CBA number 1 can be regenerated, for example, with a 450°–550° F stream withdrawn from the feed to the Claus reactor number 1. At start of the regeneration the reactor is cold, and heating is accomplished not only from the sensible heat of the feed, but from heat of the Claus reaction which is essentially complete at the low initial effluent temperature. As the converter warms up, the temperature and sulfur content of the reactor effluent increase, until a temperature plateau is reached, where the bulk of sulfur is vaporized from the catalyst. Completion of the sulfur removal is indicated by a noticeable rise in the effluent temperature. The regeneration period is continued until the effluent temperature is 600°–700° F, which corresponds to the adiabatic Claus reaction temperature of the feed. The regeneration effluent is returned via condenser number 4 to the inlet to Claus reactor number 1. This reactor is operated with an outlet temperature high enough to obtain essentially complete hydrolysis of COS and $CS_2$.

When regeneration of CBA number 1 is completed, the valves are switched to start cooling of the hot reactor, as shown in FIG. 2. During this period, 260° F tail gas from condenser number 3 is diverted to CBA 1, and then to CBA 2 via condenser 4 for final cleanup. When cooling is completed, the effluent from condenser 4 is sent directly to incineration and regeneration of CBA 2 is commenced (not shown in FIG. 1 or FIG. 2).

Figure 3:
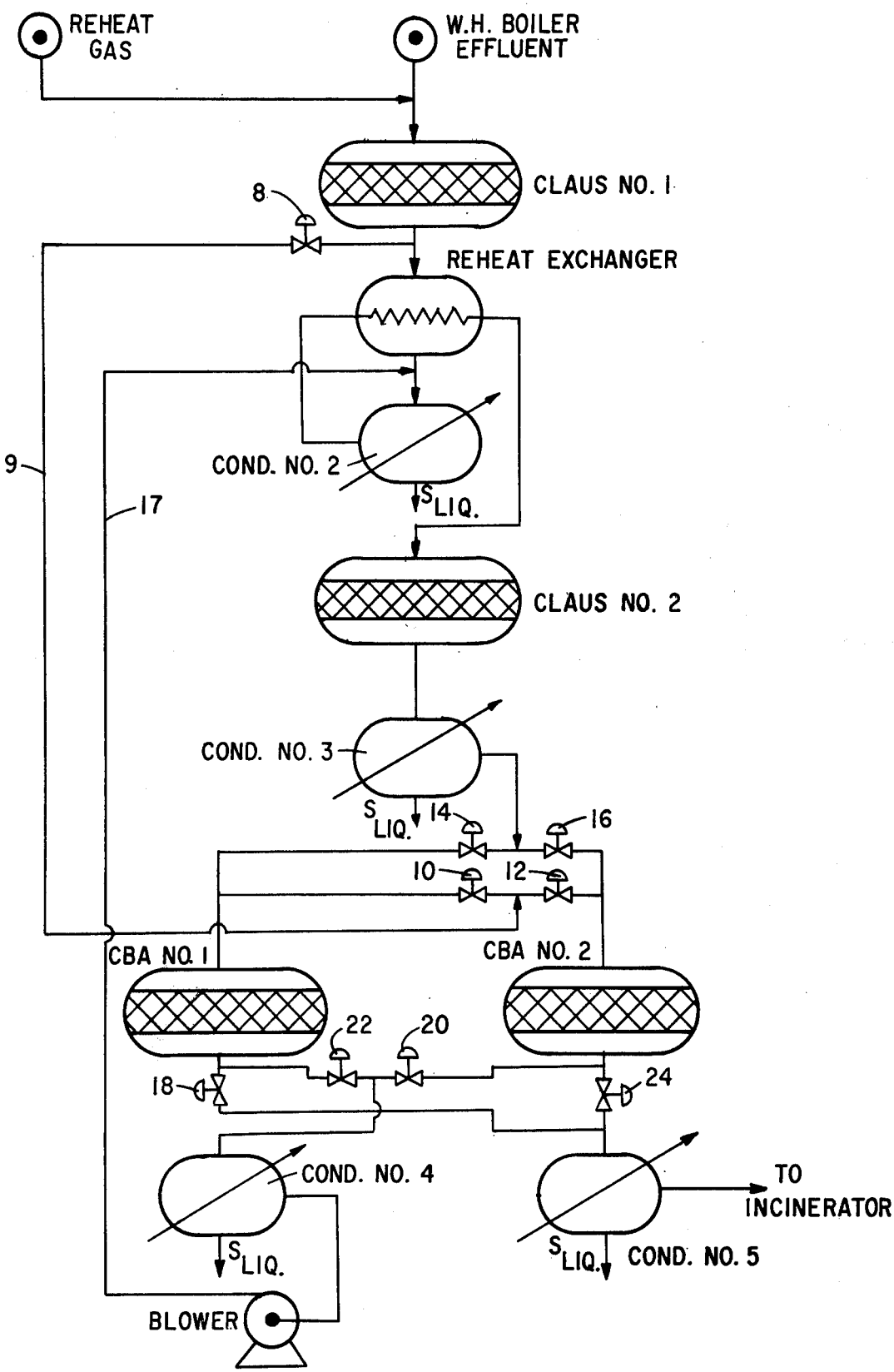
FIG. 3 and FIG. 4 of the drawing are simplified flow diagrams illustrating two specific embodiments of the improved CBA process of this invention.
Figure 4:
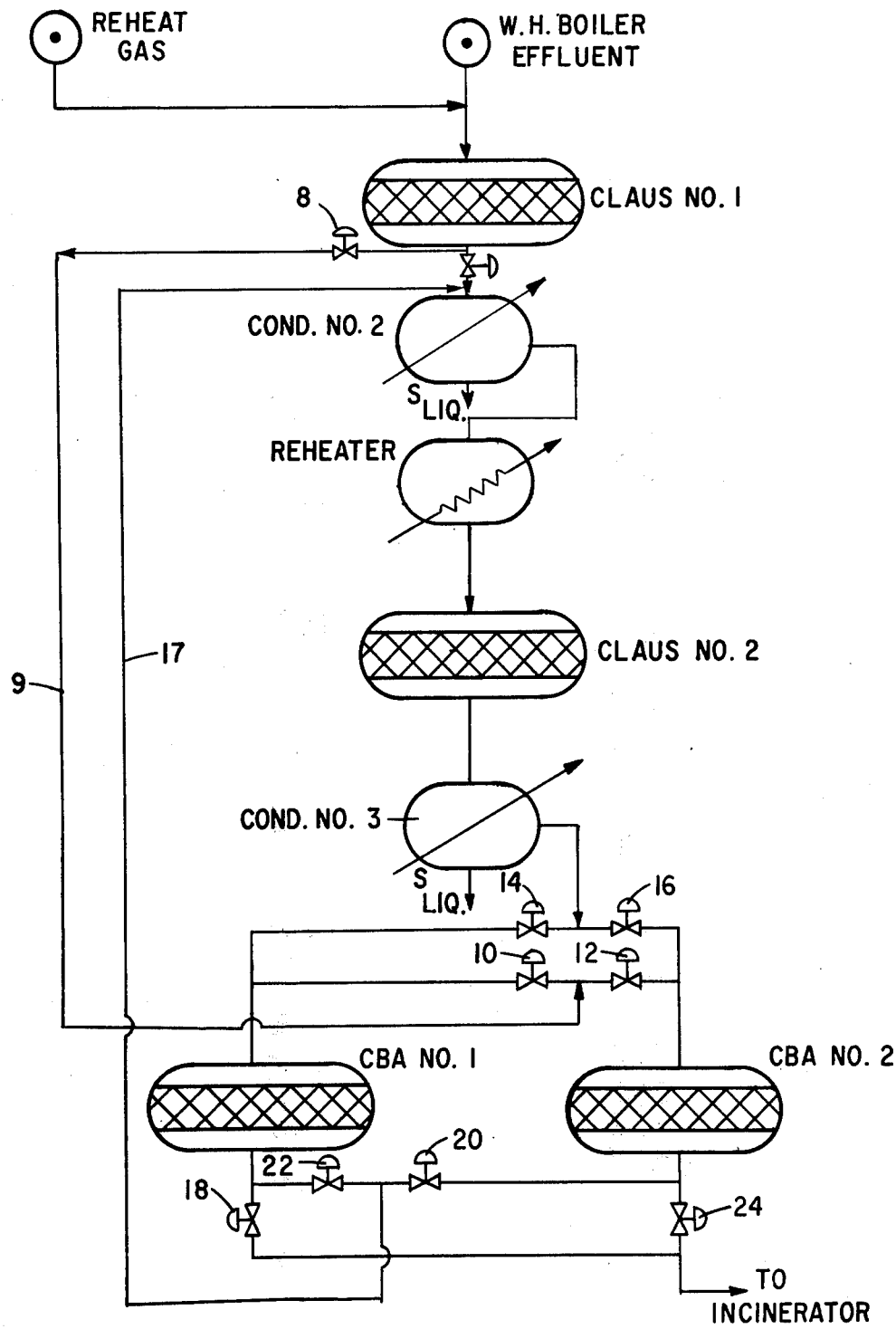

FIG. 3 and FIG. 4 of the drawing are simplified diagrams which illustrate two preferred embodiments of the present invention with the effluent from the CBA number 1 reactor being returned to upstream of condenser number 2. These figures are presented, for ease of comparison, in a format that is similar to the previous known process of FIG. 1 and FIG. 2, except all valves necessary for regeneration are superimposed on a single figure. Thus, the reader will have to envision the appropriate opening and closing of respective valves in order to explicitly duplicate the flow paths illustrated as two figures in the prior-art description.

Both FIG. 3 and FIG. 4 illustrate the basic improvement of the present invention in that the entire sulfur-containing stream is directed first through the Claus reactor number 1, the indigenous stream used for regeneration of the CBA reactors is removed from the effluent of the Claus reactor number 1, and, after passing the regeneration gas stream through the sulfur-laden CBA reactor, it is returned to a point essentially equivalent to where it was originally withdrawn.

More specifically, by directing all of the gas through Claus reactor number 1, while this reactor is maintained at an inlet temperature of about 450° to about 650° F, at space velocities between about 1 and 5 pound moles of total gas per hour per cubic foot, such that the effluent temperature of this reactor is at all times from about 600° to about 800° F, the degree of hydrolysis of COS and $CS_2$ relative to previously known processes can be maintained at sufficiently high levels that the net removal of sulfur in the overall plant will satisfy the contemporary desired ultra-high conversion levels. Further, by removing the indigenous stream for regeneration of the CBA reactor from a point downstream from the previously mentioned Claus reactor number 1 and returning the effluent from the CBA reactor during the regeneration to a point immediately downstream from where the regenerating stream is removed, the induced flow, temperature and/or pressure variations associated with the onset and cessation of regeneration and their impact on the level of sulfur conversion are minimized. Primarily this is because the withdrawal of the regeneration gas stream is isolated and, hence, independent of the first Claus reactor which is being maintained at a temperature range which optimizes hydrolysis of COS and $CS_2$. This results in two major advantages. First, regeneration of the CBA reactors will not influence the hydrolysis of COS and $CS_2$. And secondly, the flow rate and temperature of the feed gas to Claus reactor number 1 can be maintained constant at optimum conditions at all times and is not adversely affected by addition of the CBA reactors.

As already noted, the effluent temperature of the Claus reactor number 1 is maintained high enough to accomplish the regeneration in the time available and also high enough to accomplish the required degree of hydrolysis of COS and $CS_2$. Although this required effluent temperature is normally in the range of about 600° to about 800° F, it can vary widely from plant to plant, depending on the concentration of COS and $CS_2$ present to be converted as well as the required level in the effluent gas.

The basic operation of the embodiment of FIG. 3 is similar to that of FIG. 4 in that the feed gas (reheat gas and waste heat boiler effluent) enters and is catalytically processed in the Claus reactor number 1. The indigenous stream for regeneration is removed from the effluent of Claus reactor number 1 by opening valve 8 and passing the desired portion of the effluent through line 9 to the appropriate CBA reactor number 1 or 2 by opening valve 10 and closing valve 12, or by opening valve 12 and closing valve 10, respectively. When CBA reactor number 1 is being regenerated, valve 10 open and valve 12 closed, the effluent from the Claus plant is directed to CBA reactor number 2 by closing valve 14 and opening valve 16. Similarly, when CBA reactor number 2 is being regenerated, the Claus plant effluent is directed to CBA reactor number 1 for cleanup by virtue of valve 14 being open while valve 16 is closed. During regeneration of CBA reactor number 1, valves 18 and 20 are closed, while valves 22 and 24 are open, thus allowing the effluent from CBA reactor number 1 to be returned via line 17 back to a point downstream from where the regeneration gas stream is removed and upstream from Claus reactor number 2. Simultaneously, the effluent from CBA reactor number 2 is being directed through open valve 24 through condenser number 5 to the incinerator. Upon termination of the regeneration and appropriate cooling (not shown in FIG. 3 or FIG. 4, but described in detail in FIG. 5) of the previously sulfur-laden CBA reactor number 1, the regenerated CBA reactor number 1 is placed back on cleanup and the regeneration of CBA reactor number 2 is started. Again, this involves closing valves 10, 16, 22, and 24, and opening valves 12, 14, 18, and 20. In this manner, the overall process of FIG. 3 and FIG. 4 is continued with CBA reactors alternately being switched back and forth between cleanup and regeneration modes of operation.

The differences between FIG. 3 and FIG. 4 are presented in order to illustrate various alternative embodiments, each of which has, in principle, advantages which may or may not be appropriate for use, depending on the particular Claus plant, feed gas, operating conditions, and the like, yet all employ the basic improvement of our invention. In FIG. 3, the effluent from the regeneration CBA reactor goes to condenser number 4 and then is returned by means of the blower via line 17 to the inlet of the condenser downstream from the Claus reactor number 1 and upstream from Claus reactor number 2. In FIG. 4, the reheat exchange with Claus reactor effluent number 1 is eliminated and the effluent from the regenerating CBA reactor is returned to the inlet of the condenser which is downstream of Claus reactor number 1. FIG. 4 has the advantage of eliminating the mixing of two streams to form a third stream which contains liquid sulfur, thus resulting in better homogeneity prior to entering Claus reactor number 2. Another difference illustrated in FIG. 4 when compared to FIG. 3 is the elimination of the condensers downstream from the CBA reactor. Use of the reheat exchanger (in FIG. 3) restricts the amount of Claus reactor number 1 effluent gas which is used for regeneration to the range of about 5 to 75 percent. In contrast, the embodiment of FIG. 4 may use 100 percent of the Claus reactor number 1 effluent gas for fast regeneration, provided an independent source of heat (such as high-pressure steam) is available for the reheater. In performing the specific embodiment of either FIG. 4 or FIG. 3, the composition of the effluent from both CBA reactors is critical and must be monitored continuously (not shown in drawing). The effluent from either CBA reactor is returned to the second Claus reactor not only during regeneration but also during the cooling step when reverse Claus reaction products are present in the effluent. At all other times, the effluent gas from either CBA reactor can be routed directly to the incinerator.

Additional embodiments of our invention would include a flow diagram similar to FIG. 3, except the gas from the blower can be returned to the inlet of the cold side of reheat exchanger. Alternatively, the blower effluent may be returned to a separate reheater and then directly to the inlet of Claus reactor number 2. Selection of a particular method of returning the gas from the CBA reactor which is being regenerated will depend on many variables, such as: steam pressure to be generated in condenser number 2, pressure and temperature of steam or other hot fluids available for use in reheaters, range of flow rate of plant feed gas during operation, whether the CBA reactors are being provided for an existing unit or a new unit, and the like. It will be apparent to one skilled in the art how calculations can be made to select the embodiment which results in optimum values of energy conservation and equipment cost for a particular set of design conditions.

Various other specific embodiments with additional specific advantages are contemplated as being within the scope of the present invention. For example, various flow paths for regeneration of the CBA reactors may be employed. The hot regeneration gas may be directed through the regenerating CBA reactor in a direction opposite to that when the CBA reactor is being used in the cleanup mode. More particularly, when the regeneration is routed upflow through the CBA reactor and Claus plant effluent is routed downflow, the exit end of the CBA reactor is more completely regenerated during sulfur removal. This results in lower sulfur content when the Claus plant tail gas is processed and permits higher sulfur loading on the CBA catalyst before the next regeneration is required. It also improves Claus conversion during regeneration since no liquid sulfur can leave the bed and Claus equilibrium at about 540° F can be maintained for a longer time period. Similarly, the necessary cooling of the CBA bed after regeneration can be accomplished upflow instead of downflow. This would precool the lower part of the bed by about 10° to 30° F to allow final Claus equilibrium to be established at a lower temperature initially and thereby improve the time average CBA sulfur recovery. Naturally, various combinations of these alternate flows during regeneration, cooling, and cleanup can be used as required. Various reactor configurations employing more than two Claus reactors and/or more than two CBA reactors can be used. For example, three somewhat smaller CBA reactors, wherein one is regenerated while the other two are acting in parallel to process the Claus plant effluent, may be more economic. Furthermore, the improved process is consistent with allowing the cooling and regeneration time cycles to overlap, thus allowing the cooling to begin at the inlet of the regenerating bed before the outlet of the bed reaches maximum temperature. This utilizes the residual heat from the catalyst at the inlet to regenerate the outlet of the bed, hence reducing the required volume of regeneration gas and-/or the cycle time required for regeneration and cooling.

Figure 5:
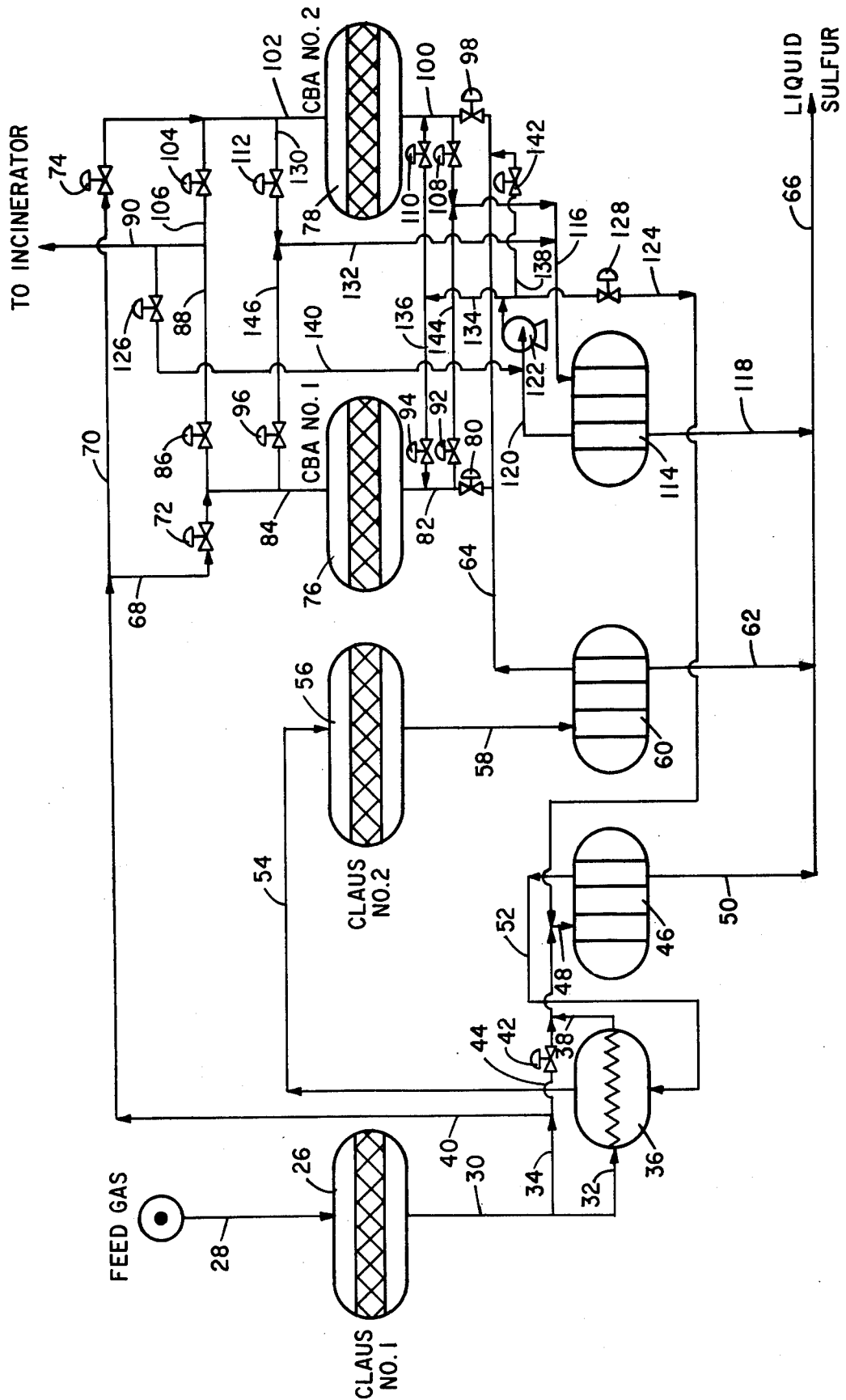
FIG. 5 of the drawing is a more detailed flow diagram illustrating how the basic improvement of this invention is incorporated into a preferred embodiment involving a pair of CBA reactors downstream from a conventional two-reactor Claus plant.

Having described various preferred embodiments and their associated differences from and their respective advantages over the prior art, FIG. 5 is presented to show in greater detail a commercial scale embodiment of the present invention involving a basic two-reactor Claus plant followed by a two-reactor CBA process.

In FIG. 5, the feed gas containing a mixture of $SO_2$ and $H_2S$ enters the first Claus reactor 26 through line 28, wherein the mixture is catalytically converted in part to elemental sulfur and water vapor. The hot effluent from this first Claus reactor 26 exits through line 30 and is split into two approximately equal volume streams in lines 32 and 34, respectively. The hot gases in line 32 pass through heat exchanger 36 from left to right, exiting through line 38. The hot gases in line 34, during the regeneration of either CBA reactor 76 or 78, are delivered to the appropriate reactor by closing valve 42 and passing via line 40 and then line 68 or 70 by opening either valve 72 or 74. During the cooling period of either CBA reactor, the hot gases in line 34 pass through line 44 and open valve 42 with valves 72 and 74 being closed, thus recombining with the heat exchanger effluent in line 38 prior to entering sulfur condenser 46 via line 48. Within sulfur condenser 46, the hot gases are cooled below the sulfur dew point, promoting the condensation and separation of liquid sulfur. The molten sulfur is then removed via lines 50 and 66 and delivered to appropriate storage. The resulting cooled sulfur-denuded gases are then sent to the heat exchanger 36 via line 52, wherein the previous hot gases in line 32 reheat the sulfur-denuded gases to a temperature appropriate for further conventional Claus-type reaction. These reheated gases then pass to a second Claus reactor 56 via line 54, wherein further catalytic conversion of $H_2S$ and $SO_2$ to sulfur and water vapor takes place. The effluent from this second Claus reactor 56 exits through line 58 and enters a second sulfur condenser 60, wherein a second cooling and separation of sulfur is performed. Liquid sulfur is then removed via lines 62 and 66 to storage. The cooled vapor is removed via line 64 and sent to the CBA portion of the overall process, hence completing the conventional two-reactor Claus-type portion of the process.

The CBA cleanup portion of the overall process, as illustrated in FIG. 5, involves a pair of CBA reactors 76 and 78, one of which is acting in a cleanup mode in that it is catalytically processing the effluent gases from the previous Claus portion of the plant, resulting in further removal of sulfur. While one of the two CBA reactors is operating in the cleanup mode, the other CBA reactor will be going through a regeneration and cooling step. At the end of this regeneration and cooling, the two reactors will exchange roles and the previous cleanup reactor will be regenerated while the freshly regenerated reactor will serve as the cleanup catalyst bed. Basically, this objective is accomplished by directing the appropriate gaseous streams to the proper CBA reactor.

Thus, when CBA reactor 76 is acting as the final cleanup step, the cooled effluent gases from the Claus plant present in line 64 are transferred to reactor 76 through open valve 80 via line 82, wherein further conversion of $H_2S$ and $SO_2$ is accomplished at a temperature of about 250°–300° F which results in more optimum conversion as well as physical adsorption of the produced sulfur on the catalyst bed. The relatively sulfur-free tail gas then exits CBA reactor 76 via line 84 through open valve 86 and lines 88 and 90 to the incinerator. During the time that CBA reactor 76 is acting in the cleanup mode, valves 72, 92, 94, 96, 98, and 104 remain closed to accomplish the desired flowpath. Meanwhile, CBA reactor 78 is being regenerated and cooled.

Regeneration of CBA reactor 78 is accomplished by passing that portion of the hot effluent gases from Claus reactor 26 which are present in lines 34, 40, and 70 through open valve 74 and via line 102 to sulfur-contaminated reactor 78. During this regeneration step, the hot gases entering reactor 78 will first warm up the sulfur-contaminated catalyst bed until vaporization of sulfur begins and then will sweep the deposited sulfur out of the reactor 78 via line 100, through open valve 108 to sulfur condenser 114 via line 116. Sulfur condenser 114 will then cool the gas and condense the sulfur being stripped from CBA reactor 78. The resulting liquid sulfur will be delivered to storage via lines 118 and 66. The cooled effluent gases will be returned to the Claus plant for further processing through lines 120, blower 122, open valve 128, and line 124. The desired flow during regeneration of CBA reactor 78 is accomplished by maintaining valves 72, 104, 112, 110, 98, 92, 126, 94, 142, and 42 closed.

Having heated the bed and removed the deposited sulfur from CBA reactor 78, the cooling process is begun by closing valves 74, 108, and 128, while opening valves 42, 110, 112, and 142, and partially opening valve 126. The flow of this cooling step involves withdrawing the gases which are present in the CBA reactor 78 after regeneration through lines 102 and 130, passing them through open valve 112 and then sending them to the sulfur condenser 114 via lines 132 and 116. During this cooling step, sulfur condenser 114 serves predominantly as a gas cooler in that virtually no sulfur will be condensed. The cooled gases from unit 114 are removed through line 120 and driven by blower 122 back to the CBA reactor 78 via lines 134 and 136, open valve 110 and line 100 completing the recycle loop and cooling the CBA reactor 78. During this cooling step, two additional streams are utilized. First, a controlled purge of tail gas from the CBA reactor 76 present in line 90 is added to the recycle stream by passing it through the partly open valve 126 and on to the inlet side of blower 122 via line 140. In this manner, not only is the quantity of gas present in the recycle mode adjustable for proper operation, but also since the tail gas contains a high concentration of water vapor and is being added slowly under controlled conditions, gradual replenishment of water vapor in the recycle cooling gas is accomplished. Thus, the rate of rehydration of the catalyst bed in CBA reactor 78 is controlled such as to minimize the deleterious effects of rapid rehydration. A second stream of recirculating gases is removed through line 138 and open valve 142 and sent to CBA reactor 76 via line 64 and 82 and open valve 80. In this manner, the hydrogen sulfide and sulfur dioxide produced by the reverse Claus reaction in the hot portion of the catalyst bed are purged from the recycle cooling system, and the net migration of residual sulfur to the inlet side of the catalyst bed is alleviated by dilution of the recycle gases with low sulfur-content tail gas.

Having regenerated and cooled CBA reactor 78, it is now placed in the cleanup mode of operation and CBA reactor 76 begins its regeneration by closing valves 42, 80, 86, 110, 112, 126, and 142 and opening valves 72, 92, 98, 104, and 128. Thus, the roles of the two CBA reactors are essentially exchanged in that the Claus plant effluent in line 64 now passes through CBA reactor 78 before being sent to the incinerator via lines 100, 102, 106, and 90, and the hot gases in line 40 are now used to regenerate CBA reactor 76. The regeneration is accomplished in a manner similar to the previously described regeneration of reactor 78, except the flow sequence involves lines 40, 68, 84, 82, 144, and 116. After the deposited sulfur has been removed from CBA reactor 76, the recycle cooling step is performed by closing valves 72 and 128, opening valves 42, 94, 96, and 142, and partly opening valve 126. The flowpath for the cooling of reactor 76 involves withdrawing gases from reactor 76 via lines 84, 146, 132, and 116, cooling these gases in condenser 114, delivering the cooled gases via line 120 to the inlet of blower 122 and then returning the cooled gases to reactor 76 via lines 134, 136, and 82. Again, the stream of tail gas in line 140 and exit stream of line 138 are employed in a manner similar to the previous cooling of reactor 78.

Having described the preferred embodiments and their advantages, it should be apparent to one skilled in the art that a great number of modifications and details of the foregoing procedures (not mentioned herein) may be made without departing from the scope of our invention. As such, this disclosure should not be interpreted as being unduly limiting.

We claim:
1. In a process for catalytic conversion of a gaseous stream containing hydrogen sulfide wherein said stream is subjected to an oxidation step to produce a reaction mixture in which hydrogen sulfide and sulfur dioxide are present in a molar ratio of about 2:1 and wherein the sulfur content of said reaction mixture is substantially reduced by first passing said mixture through a series of at least two Claus reactors with associated liquid sulfur condensers, and then passing the resulting Claus effluent through a CBA cleanup step involving at least two interchangeable CBA reactors wherein said Claus effluent at all times passes through at least one of said CBA reactors being sufficiently regenerated to further convert and condense the sulfur for a time sufficiently to allow said other interchangeable CBA reactor to be regenerated by thermal removal of deposited sulfur followed by cooling of the sulfur-denuded CBA reactor, the improvement comprising:
   a. maintaining the reaction conditions of a lead Claus reactor such that the effluent temperature of said reactor is from 600° to 800° F, thus promoting hydrolysis of COS and $CS_2$;
   b. diverting, periodically, a stream of said 600° to 800° F effluent of said lead Claus reactor to the CBA reactor having deposited sulfur on the catalyst bed of said CBA reactor, thereby vaporizing and removing said deposited sulfur and regenerating said CBA catalyst bed;
   c. returning the effluent of said CBA reactor being regenerated during said period of regeneration to a point downstream from said lead Claus reactor and downstream from where said stream is diverted but upstream to a subsequent second Claus reactor; and
   d. cooling the sulfur-denuded CBA reactor before returning it to the cleanup mode for further removal of sulfur from the effluent of said Claus reactors.

2. A process of claim 1 wherein said CBA regeneration effluent is returned to the inlet of a condenser which is located downstream of said lead Claus reactor and upstream of said second Claus reactor.

3. A process of claim 1 wherein said CBA regeneration effluent flows to a condenser for sulfur removal and then to a blower before being returned.

4. A process of claim 3 wherein said diverted stream is from about 5 to 75 percent of said effluent of said Claus reactor.

5. A process of claim 4 wherein said CBA regeneration effluent is returned to the outlet of the hot side of a reheat exchanger which is located upstream of another condenser, downstream of said lead Claus reactor and upstream of said second Claus reactor.

6. A process of claim 1 wherein said CBA regeneration effluent flows to a condenser for sulfur removal and then is returned to the inlet of the cold side of a reheat exchanger located upstream from said second Claus reactor.

7. A process of claim 1 wherein the direction of flow of said diverted stream through said CBA reactor during the removal of deposited sulfur is opposite to the direction of flow of the effluent gas from said Claus plant during catalytic conversion and depositing of sulfur by said CBA reactor.

8. A process of claim 7 wherein the direction of flow of said diverted stream during removal of deposited sulfur is upflow and the direction of flow of said effluent gas from said Claus plant is downflow.

9. A process of claim 7 wherein the direction of flow of said diverted stream during removal of deposited sulfur is downflow and the direction of flow of said effluent gas from said Claus plant is upflow.

10. A process of claim 1 wherein the direction of flow of said cooling gas through said CBA reactor after removal of said deposited sulfur in said CBA reactor is opposite to the direction of flow of the effluent gas from said Claus plant during catalytic conversion and depositing of sulfur by said CBA reactor.

11. A process of claim 10 wherein the direction of flow of said cooling gas is upflow and the direction of flow of said effluent gas from said Claus plant is downflow.

12. A process of claim 10 wherein the direction of flow of said cooling gas is downflow and the direction of flow of said effluent gas from said Claus plant is upflow.

13. A process of claim 1 wherein the direction of flow of said diverted stream and the cooling gas through said CBA reactor is the same and the cooling and regeneration time cycle overlap to allow cooling to begin at the inlet of said CBA reactor before regeneration is completed.

14. A process of claim 1 wherein there are three CBA reactors downstream from said Claus plant, two of said CBA reactors acting in parallel to clean up the Claus plant effluent while the third CBA reactor is being regenerated.

15. A method of claim 1 wherein the need for a condenser downstream from said CBA reactor is eliminated by returning the flow of CBA regeneration and cooling effluent to a point upstream of at least one condenser and Claus reactor in series, during the regeneration and the cooling of said CBA reactors and during the time when reverse Claus reaction products are present in the CBA effluent, and at all other times directing the CBA effluent to an incinerator without passing through a condenser.

16. A process of claim 1 wherein said CBA regeneration effluent is returned to the inlet of a condenser which is located downstream of said lead Claus reactor and upstream of said second Claus reactor and wherein the direction of flow of said diverted stream through said CBA reactor during regeneration and the flow of said cooling gas through said CBA reactor after regeneration is opposite to the direction of flow of the effluent gas from said Claus plant during catalytic conversion and depositing of sulfur by said CBA reactor.

17. A process of claim 5 wherein said CBA regeneration effluent being returned to the outlet of the hot side of said reheat exchanger then flows to the inlet of a condenser which is located downstream of said lead Claus reactor and upstream of said second Claus reactor.

* * * * *